United States Patent [19]

Bendall

[11] 4,266,435

[45] May 12, 1981

[54] SEGMENTAL ROLLER DRIVE CHAIN

[76] Inventor: Wilfrid H. Bendall, 48-18 43rd St., Woodside, N.Y. 11377

[21] Appl. No.: 48,716

[22] Filed: Jun. 15, 1979

Related U.S. Application Data

[63] Continuation-in-part of Ser. No. 947,483, Oct. 2, 1978, abandoned.

[51] Int. Cl.³ .............................................. F16G 13/02
[52] U.S. Cl. ................................... 474/227; 403/154; 474/229
[58] Field of Search ........... 74/245 R, 245 LP, 245 S, 74/247, 248, 249, 250 R, 250 S, 251 R, 251 C, 251 S, 252, 253 R, 253 S, 254; 198/834, 845, 849, 850, 851, 852, 853; 305/39, 52, 57, 58 R; 403/154, 161

[56] References Cited

U.S. PATENT DOCUMENTS

| | | | |
|---|---|---|---|
| 1,270,460 | 6/1918 | Taylor | 74/245 S |
| 3,118,317 | 1/1964 | Michalik | 74/250 R |
| 3,353,421 | 11/1967 | Ketterle et al. | 74/253 R |
| 3,540,302 | 11/1970 | Bendall | 74/253 R |
| 3,742,776 | 7/1973 | Avramidis | 74/251 S |
| 3,916,709 | 11/1975 | Stever et al. | 74/253 R |
| 4,010,656 | 3/1977 | Jeffrey | 74/245 S |
| 4,058,021 | 11/1977 | Wood | 74/245 R X |

FOREIGN PATENT DOCUMENTS 293937  7/1928  United Kingdom ................ 74/253 S

*Primary Examiner*—George H. Krizmanich
*Assistant Examiner*—Moshe I. Cohen

[57] ABSTRACT

The chain has laminated, laterally flexible link members interconnected by pairs of rocker-joint bearing members. The laminated links freely engage and are retained by transversely spaced notches in the bearing members, which also engage drive sprocket teeth. The chain is manually separable and is designed to operate on the industrially standardized roller chain type drive sprockets.

5 Claims, 6 Drawing Figures

SEGMENTAL ROLLER DRIVE CHAIN

BACKGROUND OF THE INVENTION

1. Field of the Invention

This invention relates generally to power transmission link chains and more particularly to a modification of the segmental roller chain disclosed in U.S. Pat. No. 3,540,302, issued Nov. 17, 1970 to the present inventor and is a continuation-in-part of patent application Ser. No. 947,483 filed Oct. 2, 1978 by the present inventor and now abandoned.

2. Description of the Prior Art

As is well known in the art, the industrially standardized roller chain, while of potentially higher power transmission capacity than any other known type of drive chain, is limited in performance by a link joint construction generally acknowledged to be extremely difficult to lubricate effectively at and above certain chain linear speed and load conditions which its link members otherwise are potentially capable of transmitting. A related limitation resides in the high lateral rigidity and consequent limited misalignment accommodation imposed by its inherent design requirement for rigid press-fits of the link members to the joint pins and bushings, for which the latter have to be relatively heavy and inflexible, and have to be assembled with closely limited operating clearances.

SUMMARY OF THE INVENTION

The link members of the chain of this invention each comprise a plurality of apertured, loosely assembled and laterally flexible laminas arranged end to end with overlapping end portions and registering apertures. The laminated links are interconnected by pairs of segmental rocker-bearing members extending transversely through the apertures. The bearing members are notched at transversely spaced points to provide bearing seats for edge portions of the apertures of the link laminations and also to retain them transversely apart with the clearance required for engaging standard roller chain sprocket teeth. The pairs of rocker-bearing members, as combined with coacting bearing interfaces, are functionally and dimensionally equivalent to the rollers of the standard roller chain.

With link members comprising loosely assembled, laterally flexible lamina, and with bearing members effectively open to lubrication and operation with a relatively frictionless rocker-bearing action, the chain of this invention substantially eliminates the aforesaid rigid assembly design characteristics limiting roller chain performance. The separate laminas of the link members are free to flex incrementally and pivot laterally on their notch seating on the rocker-bearing members in response to normally unavoidable drive misalignments, and can thus distribute the working stresses more evenly across the width of the chain.

It is thus among the primary objects of this invention to provide a laterally flexible drive chain of basic roller chain configuration and of simple, low cost construction; such a drive chain free from critical lubrication requirements and with improved drive misalignment accommodation; also, a drive chain conveniently detachable without tools and in which the transmission capacity can be varied by selective change of its bearing elements alone, without changing other parts or the proportions of its assembly. These and other objects and advantages will be further apparent following reference to the drawing figures, description and claims of this application.

DESCRIPTION OF THE PREFERRED EMBODIMENT

Figures 1, 2:
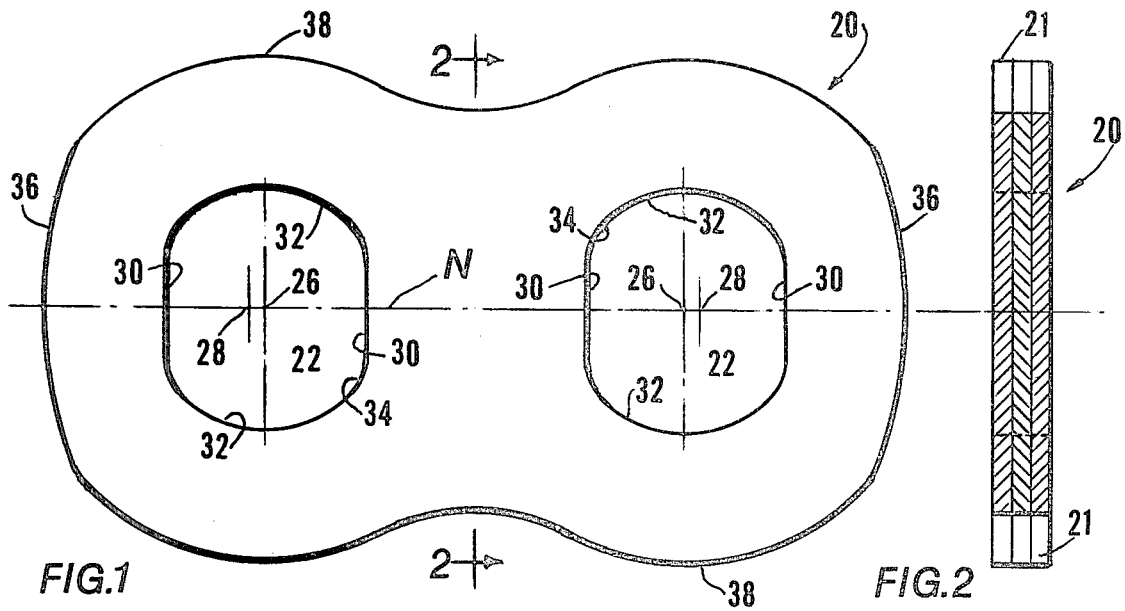
FIG. 1 is an enlarged view in elevation of the laminated link member of the chain of this invention.
FIG. 2 is a sectional view on the line 2—2 of FIG. 1.
Figure 3:
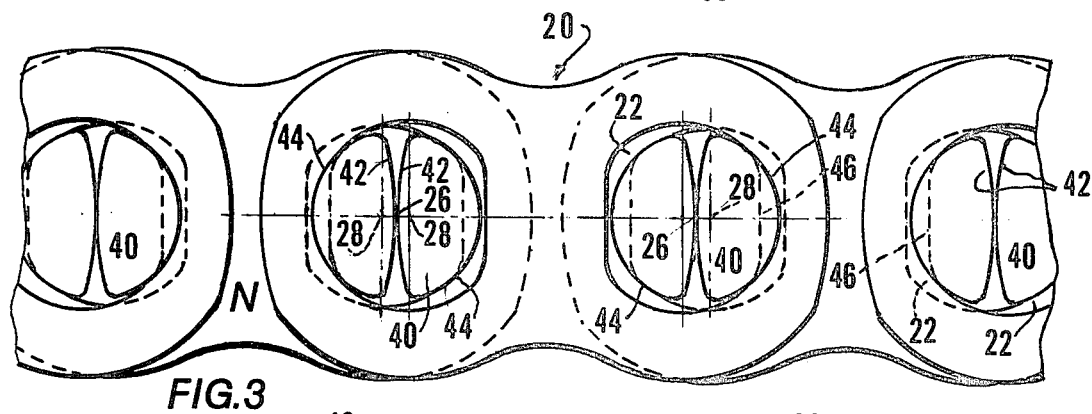
FIG. 3 is a view in elevation of a portion of an assembled chain.
Figure 4:
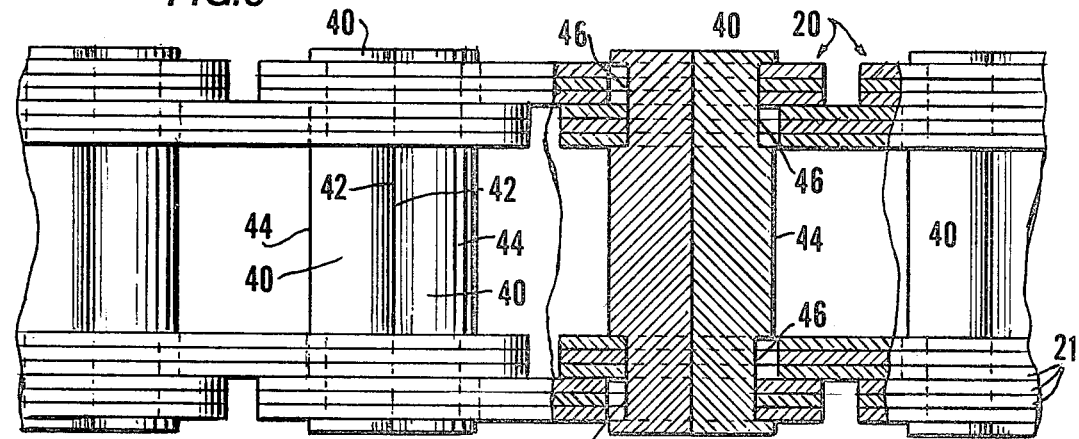
FIG. 4 is a partly sectioned plan view of the chain of FIG. 3.

In FIGS. 1 and 2 reference numeral 20 designates the preferred form of the link members, illustrated as each comprising a plurality of comparatively thin, loosely assembled laterally flexible laminas 21, having apertures 22 at each end. As shown in FIGS. 3 and 4, the links are arranged end to end with overlapping end portions and registering apertures and are interconnected by pairs of segmental roller bearing members 40 extending transversely through the apertures. Bearing members 40 have arcuate interface portions 42 for rocking bearing contact with each other and have laterally spaced notches 46 on their outerface portions 44 constituting link locating and retention means.

Figures 5, 6:
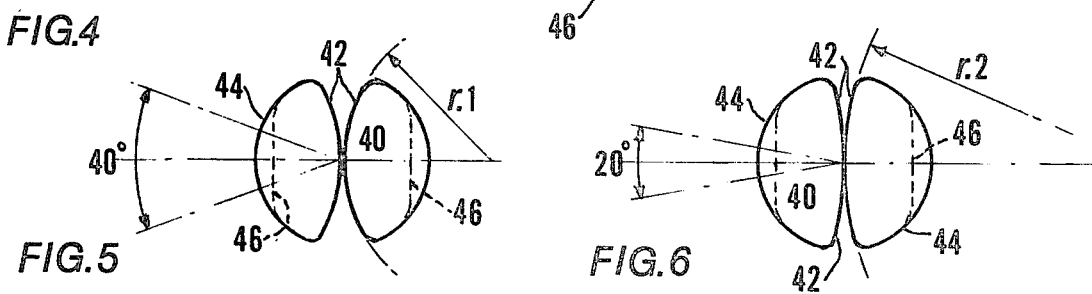
FIGS. 5 and 6 are diagrammatic views of operating parameters of the bearing members of this chain.

As assembled, link lamina aperture edge portions 30 seat on the notched portions of the bearing members and are secured transversely apart thereon by abutting walls of the notches. In effecting this mode of assembly the apertures of adjacent overlapping link ends are brought into registration for lateral insertion of the bearing segments. A slight endwise pull then moves the aperture edge portions into seating on the notched portions of the bearing members. This mode of chain assembly and link retention also facilitates selective substitution of segmental bearing members 40 with different arcuate interface radii, designated r.1 and r.2 in FIGS. 5 and 6, to vary chain operating characteristics without changing other parts of the assembly.

The link members of this chain comprising, as shown sectionally in FIGS. 2 and 4, a plurality of relatively thin, loosely assembled and not rigidly constrained laminas 21, conveys the further advantage of higher intrinsic tensile strength and fatigue resistance since the thinner material, as usually processed, is more thoroughly worked and can be more uniformly heat treated to obtain maximum physical properties. The link apertures 22 are symmetrical about the imaginary longitudinal axis N and have a geometrical center 26 and a link articulation center 28 on the axis. The apertures also have equal and opposite edge portions 30 extending normal to the axis and equal and opposite arcuate edge portions 32 substantially parallel to the axis. The lines of these edge portions are smoothly interconnected to comprise a continuous non-reentrant aperture edge. Outer ends 36 of the link members are eccentrically arcuate about the aperture centers and intersect arcuate, axially extending edge portions 38, also substantially parallel to the axis. Laminated link members so shaped and fabricated have potentially higher fatigue strength and will effectively utilize the high specific bearing capacity of the segmental joint members 40, thus conveying the concomitant advantage of a more compact, lower cost chain drive for a given power transmission requirement.

As will be seen from further reference to FIGS. 3 and 4, the coacting arcuate interfaces 42 of the segmental bearing elements 40 are adapted to rock under load with a relatively frictionless bearing action during link articulation when engaging drive sprockets. External arcuate portions 44 of these bearing elements are of constant radius and together comprise a sprocket tooth engagement element with a combined external diameter substantially equal to the diameter of the rollers of standard roller chains and the chain will thus operate on the standard drive sprockets.

While drawing FIGS. 2 and 4 illustrate the link lamina as assembled with adjacent surfaces in lateral proximity without a defined clearance space between them it is to be understood that, as thus illustrated, they are freely aligned without lateral pressure and are not tightly fitted at any point of the assembly.

What is claimed is:

1. A segmental roller drive chain having loosely assembled, apertured link members spaced transversely apart with overlapping end portions and registering apertures, interconnected by coacting pairs of segmental rocker-bearing members extending through the apertures, each of said link members comprising a plurality of comparatively thin, laterally flexible laminas in loose lateral contact with each other, each of said rocker-bearing members having coacting arcuate bearing portions and arcuate portions external thereto for engaging drive sprocket teeth, said portions external thereto being notched to engage and retain the link members transversely apart thereon, each of said laminas having aperture edge portions in loose bearing contact with the notched portions, the apertures of said link members comprising an assembly clearance for free manual insertion or removal of the bearing members for selective substitution or replacement with members having coacting arcuate bearing contact portions of different radii.

2. The chain of claim 1 wherein each link assembly is longitudinally movable out of its notched retention for detachment of a chain length and removal or insertion of bearing members.

3. The chain of claim 1 wherein rocker-bearing members are selectively changed to vary chain operating characteristics.

4. The chain of claim 1 wherein coacting rocker-bearing members are substantially identical in sectional form.

5. The chain of claim 1 wherein the link apertures are substantially symmetrical about a longitudinal center line.

* * * * *